United States Patent
Sheilendra

(10) Patent No.: US 8,818,405 B2
(45) Date of Patent: Aug. 26, 2014

(54) RECOGNITION SYSTEM

(76) Inventor: Suman Sheilendra, Matthews, NC (US)

( * ) Notice: Subject to any disclaimer, the term of this patent is extended or adjusted under 35 U.S.C. 154(b) by 0 days.

(21) Appl. No.: 13/492,910

(22) Filed: Jun. 10, 2012

(65) Prior Publication Data

US 2013/0005354 A1    Jan. 3, 2013

Related U.S. Application Data

(60) Provisional application No. 61/503,589, filed on Jun. 30, 2011.

(51) Int. Cl.
*H04W 24/00*    (2009.01)

(52) U.S. Cl.
USPC .................. 455/456.1; 455/404.2; 455/456.2; 455/186.1; 455/418; 455/419

(58) Field of Classification Search
CPC ....... H04W 4/02; H04W 4/027; H04W 64/00; H04W 4/008; H04W 4/08; H04W 4/18; H04W 4/185; H04W 52/0251; H04W 60/04; H04W 68/00; H04W 8/186; H04W 12/02; H04W 12/08; H04W 56/0005; H04W 72/0406; H04W 76/02; H04W 36/06; H04W 92/18; H04W 52/50; H04W 56/002; H04W 64/006; H04W 48/04; H04W 4/021; H04M 1/72533; H04M 2242/30; H04M 3/42229; H04M 1/72572; H04M 1/6041; H04M 3/58; H04M 2207/18; H04L 41/0806; H04L 67/125; H04L 5/0085; H04L 69/329; H04L 67/26; H04L 12/581; H04L 67/38; H04L 67/18; Y02B 60/50
USPC .................. 455/456.1–456.6, 352, 353, 41.2, 455/186.1, 418, 419; 340/539.1
See application file for complete search history.

(56) References Cited

U.S. PATENT DOCUMENTS

| | | | | |
|---|---|---|---|---|
| 2006/0099969 | A1* | 5/2006 | Staton et al. | 455/456.4 |
| 2008/0100439 | A1* | 5/2008 | Rinkes | 340/572.1 |
| 2008/0188207 | A1* | 8/2008 | Lee | 455/414.1 |
| 2009/0100497 | A1* | 4/2009 | Goldberg et al. | 726/1 |
| 2009/0318168 | A1* | 12/2009 | Khosravy et al. | 455/456.3 |
| 2010/0090831 | A1* | 4/2010 | Zhao et al. | 340/572.1 |
| 2010/0294842 | A1* | 11/2010 | Forster | 235/487 |
| 2011/0158441 | A1* | 6/2011 | Batra | 381/311 |
| 2011/0254687 | A1* | 10/2011 | Arponen et al. | 340/540 |

FOREIGN PATENT DOCUMENTS

KR    2004039562    *    5/2004

* cited by examiner

*Primary Examiner* — Charles Appiah
*Assistant Examiner* — Edward Zhang
(74) *Attorney, Agent, or Firm* — Geoffrey Gelman

(57) ABSTRACT

According to various embodiments, a first electronic device may be configured to communicate wirelessly with a second electronic device. If the devices become separated, then various steps may be taken to avoid or to mitigate the loss of one of the devices.

4 Claims, 12 Drawing Sheets

IDENTIFY GPS & MARK DANGER ZONE

1200

Set up your alarm conditions.

| | |
|---|---|
| Separation distance to trigger alarm | 10m |
| Alarm volume | High |
| Alarm melody | Crickets |

Select paired Bluetooth tags

| Tag | Status | |
|---|---|---|
| Tag ID #124 | Paired | Unpair |
| Tag ID #263 | In range | Pair |
| Tag ID #263 | In range | Pair |

Data Protection Options

| Data | Option |
|---|---|
| Address Book | ▽ Encrypt |
| Photos | ▽ Backup |
| Music | ▽ Backup |

Figure 12

RECOGNITION SYSTEM

RELATED APPLICATIONS

The present application claims the benefit of priority of U.S. Provisional Patent Application Ser. No. 61/503,589, entitled "Recognition System", filed Jun. 30, 2011, the entirety of which is incorporated herein for all purposes.

BACKGROUND

With a proliferation of small devices and electronic devices, among others, it may be desirable for a user to have ways of tracking such devices and mitigating the potential for loss.

BRIEF DESCRIPTION OF THE FIGURES

FIG. 12 illustrates a graphical user interface, according to some embodiments.

DETAILED DESCRIPTION

Figure 1:
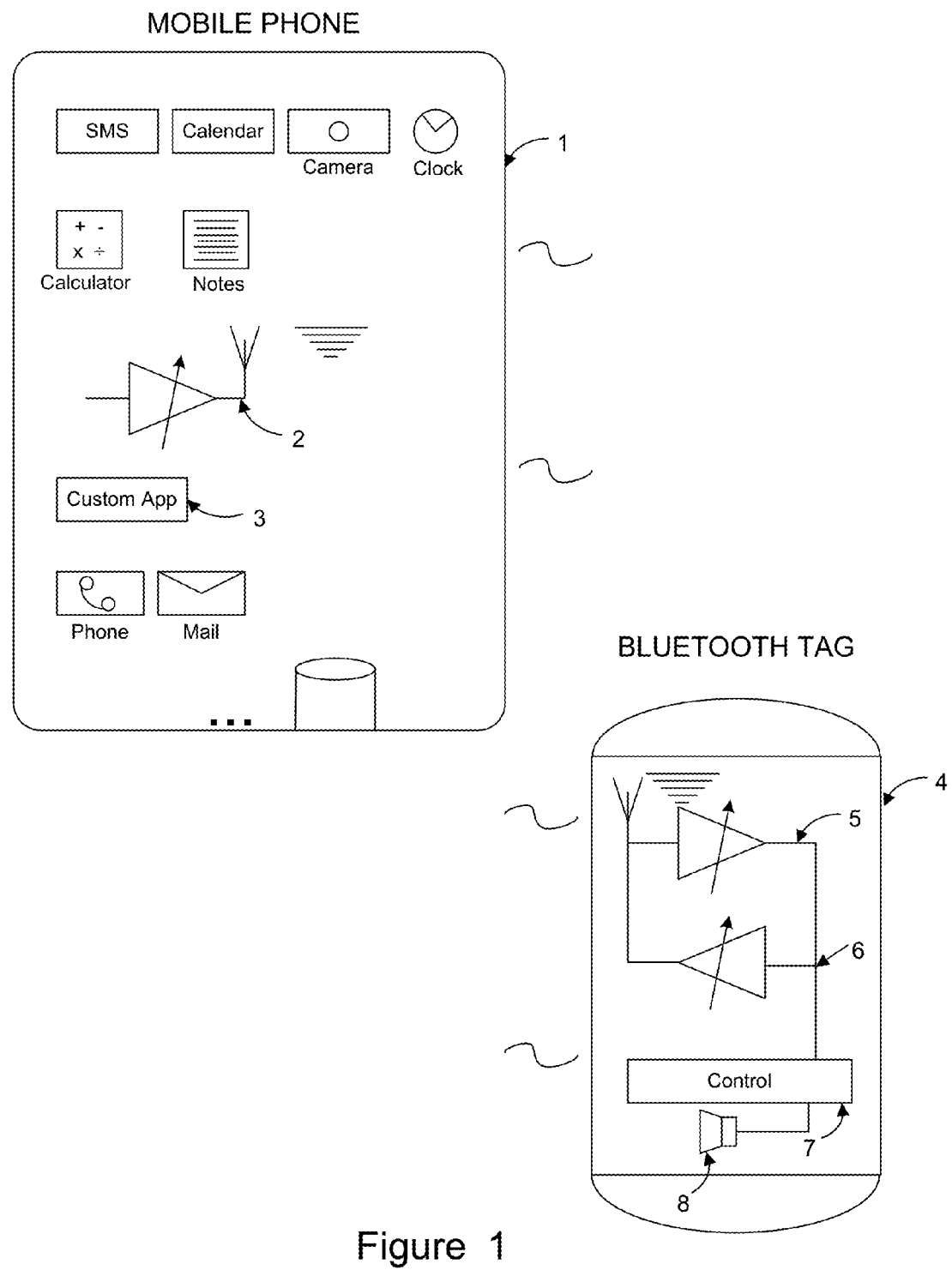
FIG. 1 illustrates a system according to some embodiments.

In various embodiments, Citizens' Band Radio (CB radio) may refer to a system for short-range communications via radio that may be available for individual usage (e.g., for usage by individuals with minimal or no licensing requirements). CB radio may include communications via channels in the vicinity of 27 megahertz.

In various embodiments, Bluetooth may refer to a wireless technology for exchanging data over small distances.

According to various embodiments, it may be desirable for a user to keep track of one or more electronic devices. Such devices may include cellular phones, smart phones, personal digital assistants, portable music players, mp3 players, iPods, laptop computers, portable computers, tablet computers, iPads, pagers, game players, global positioning system receivers, keys, electronic wallets, watches, and so on. As may be appreciated, such devices may possess intrinsic value to the user. For example, such devices may include user data, contact information for the user's friends or business associates, favorite songs, favorite games, and so on. Such items may also allow the user certain abilities or privileges, such as access to his car or access to a building. Such devices may also possess general value. For example, a laptop or mp3 player may carry a price tag in the hundreds or thousands of dollars.

Further, due to small size and other factors, it may be easy for a user to lose or misplace an electronic device. An electronic device may also be vulnerable to theft. As such, it may be desirable, in various embodiments, for a user to reduce the likelihood of losing an electronic device, to increase the chances of finding a lost electronic device, and/or to mitigate the consequences if an electronic device actually is lost.

In some embodiments, it may be desirable for a user to keep track of one or more other objects. For example, a user may wish to keep track of an item of jewelry or a handbag. In some embodiments, it may be desirable for a user to keep track of one or more animate objects, such as a pet or child.

According to various embodiments, a first electronic device may maintain communication with a second electronic device via a wireless protocol, such as Bluetooth. One or more characteristics of the wireless protocol may be used to track the distance between the two devices. One or more characteristics of the wireless protocol may be used to track the relative position of the two devices. For example, in various embodiments, a weaker signal strength detected for the wireless protocol may indicate a greater distance between the first electronic device and the second electronic device.

Based on the relative position of the two devices, it may be determined that the second device is in danger of becoming lost, becoming stolen, or otherwise being misplaced. Accordingly, in various embodiments, one or more countermeasures may be initiated. Countermeasures may include measures to reduce the chances of the second device being lost, stolen, or misplaced. Such measures may include the broadcasting of an audio alarm. Countermeasures may also include measures to mitigate the consequences of a loss, such as locking access to data on the second device, or backing up data from the second device onto the first device.

Thus, according to various embodiments, a user may be able to more readily keep track of electronic devices. In some embodiments, if a user wishes to track another object, such as handbag, then that object may be associated with an electronic device. For example, the electronic device may be attached to, or incorporated into the design of the object. Thus, the probable loss of the electronic device would also signal the probable loss of the associated object.

Similarly, in the case of a pet, human, or other animate object, an electronic device may be associated with the animate object. For instance, a pet could wear a collar that incorporates an electronic device, or a child could wear a bracelet that incorporates an electronic device. Thus, the probable loss of the electronic device would also signal the probable loss of the associated pet, child, or other animate object.

Referring to FIG. 1, a mobile phone 1 and a Bluetooth tag 4 are shown. Whereas this and other figures illustrate a phone, it will be appreciated that various embodiments are not limited to just phones, and that the described embodiments may also apply to other electronic devices. Whereas this and other figures illustrate a Bluetooth tag, it will be appreciated that various embodiments are not limited to just Bluetooth tags, and that the described embodiments may also apply to other electronic devices (e.g., to other devices using Bluetooth; e.g., to devices using Wi-Fi or other wireless communication protocols, etc.).

Mobile phone 1 includes an antenna 2, and a customized software application 3 loaded onto the phone. The customized software application 3 may represent a sequence of computer code stored in a memory of the mobile phone, for example. The software application may be available for purchase and or download via an internet-based application store, or via any other means, in various embodiments.

In various embodiments, the mobile phone 1 may include various hardware components, including a processor, graphics processing unit, memory, display screen, touch screen, speaker, jacks for a headset, input devices (e.g., buttons, scroll wheel, microphone, etc.), keypad, antennas, battery, power source, universal serial bus input jack, and so on.

The antenna 2 may be capable of sending wireless signals. The antenna 2 may be capable of varying the signal strength of sent signals. The antenna may be capable of transmitting Bluetooth signals.

In various embodiments, the Bluetooth tag 4 may include an antenna with circuitry 5 for sending wireless signals via the antenna, and circuitry 6 for receiving wireless signals via the antenna. Such wireless signals may include Bluetooth signals. The Bluetooth tag 4 may further include a controller 7 for controlling the sending and receiving of signals via the antenna. In some embodiments, the controller may execute computer instructions for carrying out one or more embodiments described herein. In some embodiments, the Bluetooth tag 4 may include a memory for storing computer programs and/or computer instructions. Bluetooth tag 4 may include a speaker 8. The speaker 8 may be capable of emitting audio, such as pre-recorded or synthesized voice. The speaker may also be capable of emitting other audio, such as a tone or alarm.

In various embodiments, Bluetooth tag 4 may include a battery or other power source. In various embodiments, the Bluetooth tag may include a display, speaker, microphone, buttons, keypad, touchpad, touch screen, speaker jacks, USB plug, or any component.

In various embodiments, the components of the Bluetooth tag may be housed in a relatively small or compact form factor. The form factor may measure, for example, 20 by 40 by 5 millimeters. Thus, the Bluetooth tag may be readily portable and may be easy to build into other objects for the purposes of tracking such objects.

Figure 2:
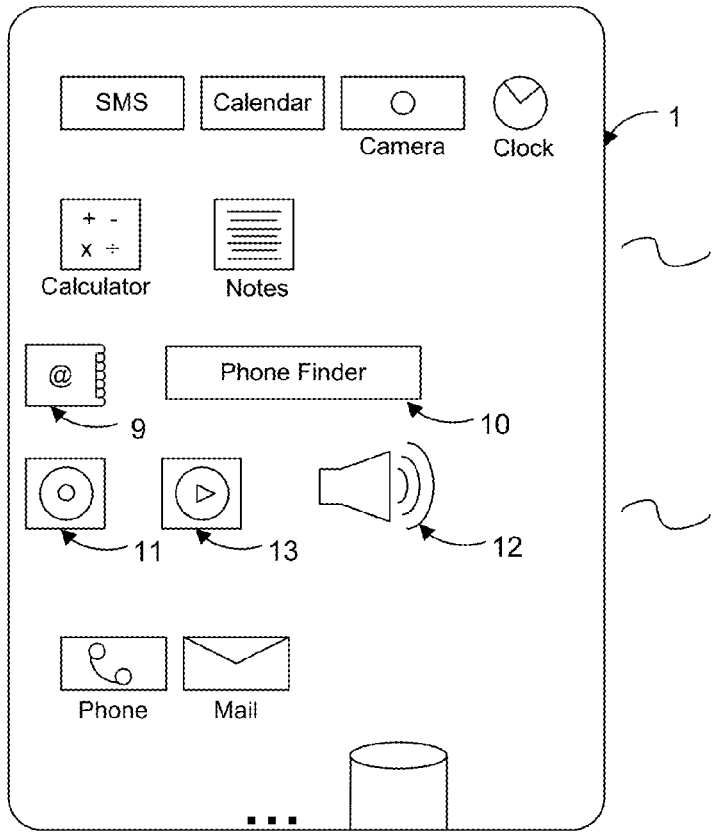
FIG. 2 illustrates a system according to some embodiments.
Figure 2:
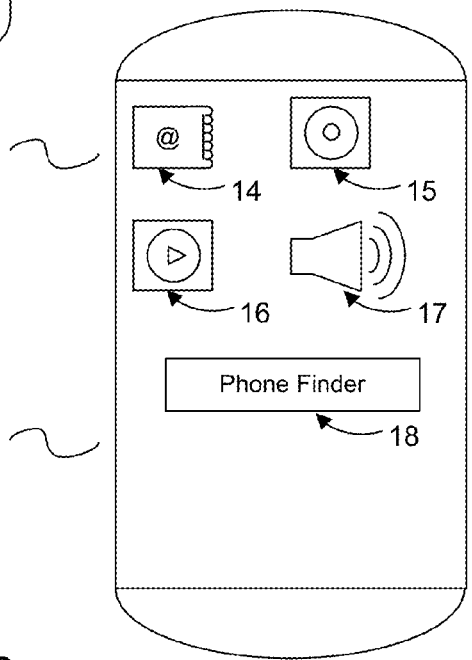

Referring to FIG. 2, a mobile phone and a Bluetooth tag are shown. The mobile phone may include various applications and data. An application may include a program that can be executed on the phone. An application may be accessed or initiated, for example, through a user touching an icon on a touch screen of the phone. In some embodiments, the phone may include an address book, represented by icon 9. The address book may store contact information for a user's friends, colleagues, associates, etc. The phone may include a phone finder application, represented by icon 10. The phone finder application may allow the location of the phone to be provided to another phone in the event that the phone is lost. The phone may include an application for synchronizing data, represented by icon 11. The application may cause the phone to transmit data (e.g., critical data) to another phone or device. Similarly, the application may cause the phone to receive new data from another device when such data had first been updated on the other device. In some embodiments, the mobile phone may include a voice application. In some embodiments, the mobile phone may include a video application, represented by icon 13. The video application may include an application that plays videos (e.g., a media player), an application that records videos, and/or an application that stores videos (e.g., videos that the user has recorded using the phone).

In various embodiments, the Bluetooth tag may include analogous applications and data to those stored on the mobile phone. The Bluetooth tag may include an address book 14, an application to synchronize data 15, a video application 16, a voice application 17, and a phone finder application 18.

In various embodiments, when the mobile phone and the Bluetooth tag become separated beyond a predetermined distance, or when some other triggering condition is detected, one or more applications of the mobile phone and Bluetooth tag may communicate in order to safeguard data, duplicate data, and/or otherwise mitigate the potential loss or compromise of data. For example, the address book of the phone may get transmitted to the Bluetooth tag, so that the Bluetooth tag now has a complete copy of the data stored in the phone's address book. Thus, if the phone becomes lost, a user will be able to recover his address book from the Bluetooth tag. In some embodiments, as the phone and Bluetooth tag become separated, the address book may become locked. For example, the address book may become password protected. In this way, sensitive contact information belonging to the owner of the mobile phone will not be visible to a third party who comes into possession of the phone.

Figure 3:
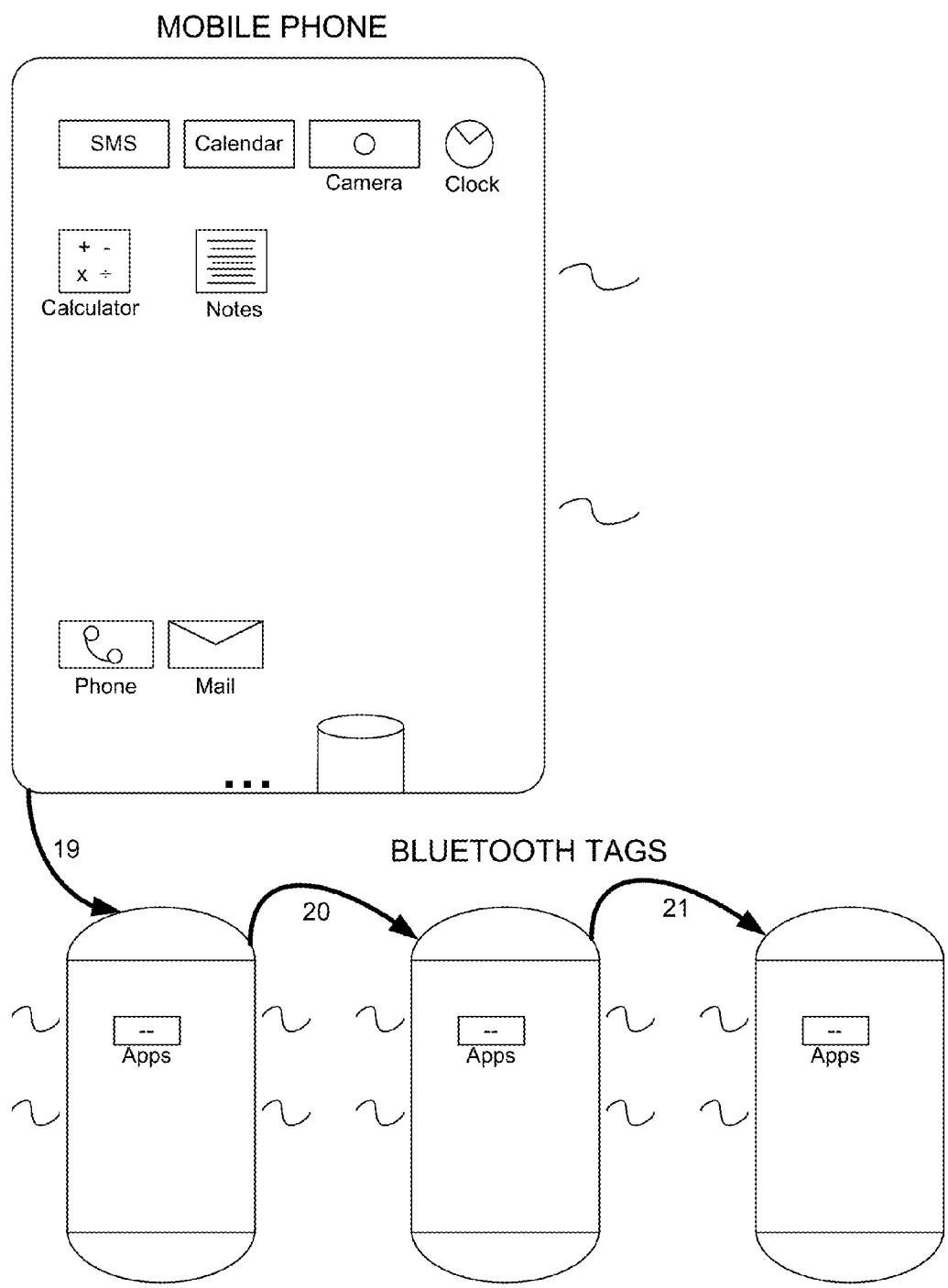
FIG. 3 illustrates a system according to some embodiments.

Referring to FIG. 3, a mobile phone and a three distinct Bluetooth tags are shown. While the figure illustrates 3 Bluetooth tags, it will be appreciated that in various embodiments, more or fewer Bluetooth tags may be involved. The mobile phone may establish a communication link 19 with a first of the Bluetooth tags. The first Bluetooth tag may, in turn, establish a communication link 20 with a second of the Bluetooth tags. The second Bluetooth tag may, in turn, establish a communication link 21 with a third of the Bluetooth tags. In various embodiments, certain Bluetooth tags may serve as relays, allowing, for example, the mobile phone to communicate indirectly with a Bluetooth tag which is not within its direct range of communication. As is depicted in the figure, there is a linear "chain" of communication from the mobile phone to a given Bluetooth tag. However, it will be appreciated that one or more mobile phones and one or more Bluetooth tags may form a "web" of communications links whereby a single device may have direct communication links to multiple other devices, and where a first device may communicate with a second device via multiple possible paths and intervening "relay" devices.

Figure 4:
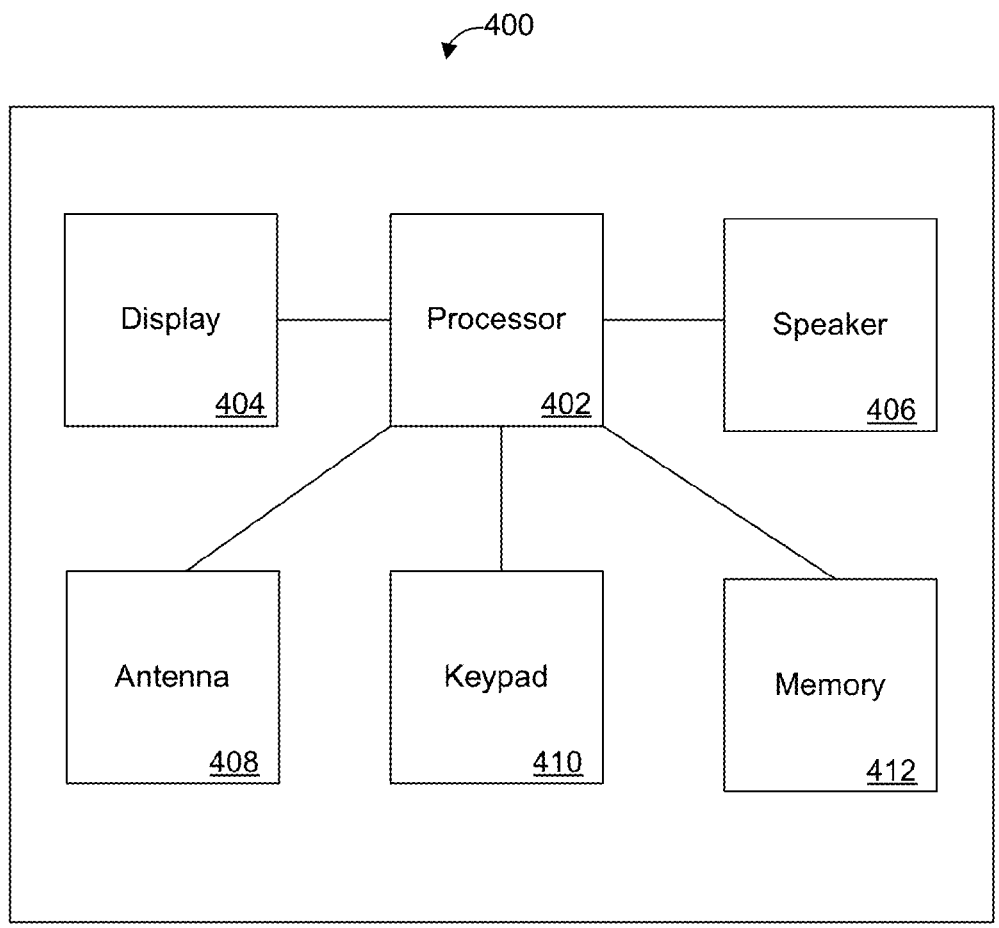
FIG. 4 illustrates a mobile phone according to some embodiments.

Referring to FIG. 4, a mobile phone is shown according to some embodiments. While the figure shows certain illustrative and exemplary components, it should be understood that fewer or additional components are also contemplated, according to various embodiments, and that various arrangements of the components are also contemplated. Further, it should be understood that individual components may be implemented with multiple components working together, and that certain separate components may be implemented as a single unified component, in some embodiments.

Figure 5:
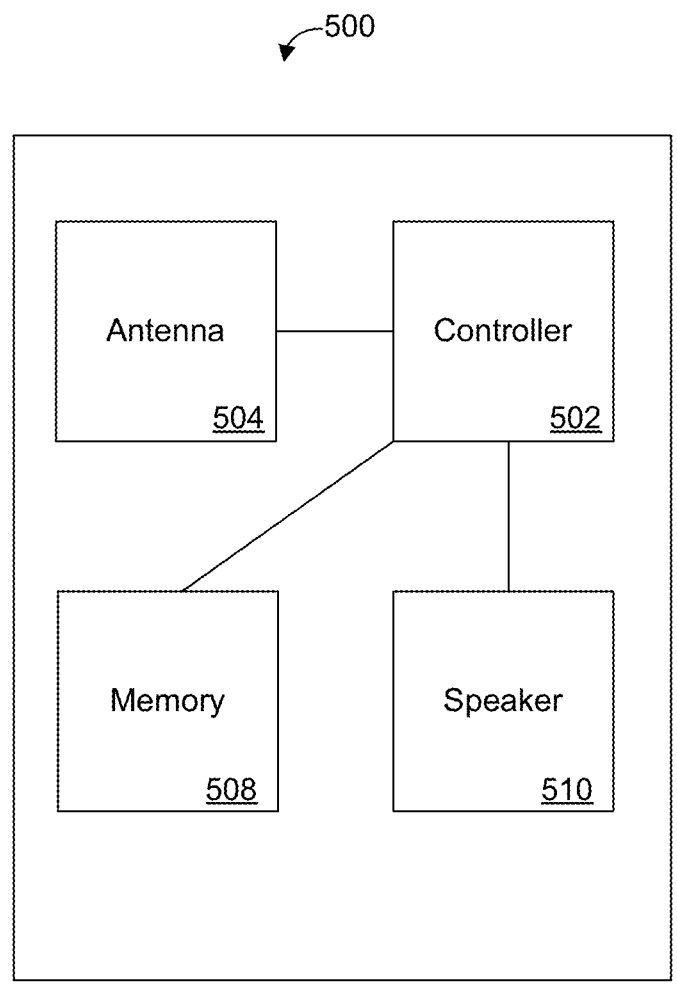
FIG. 5 illustrates a Bluetooth tag according to some embodiments.

FIG. 5 illustrates a Bluetooth tag according to some embodiments. Antenna 504 may be capable of transmission of wireless signals, such as Bluetooth signals. Speaker 510 may be capable of broadcasting an audible alarm or other sound. While the figure shows certain illustrative and exemplary components, it should be understood that fewer or additional components are also contemplated, according to various embodiments, and that various arrangements of the components are also contemplated. Further, it should be understood that individual components may be implemented with multiple components working together, and that certain separate components may be implemented as a single unified component, in some embodiments.

Figure 6:
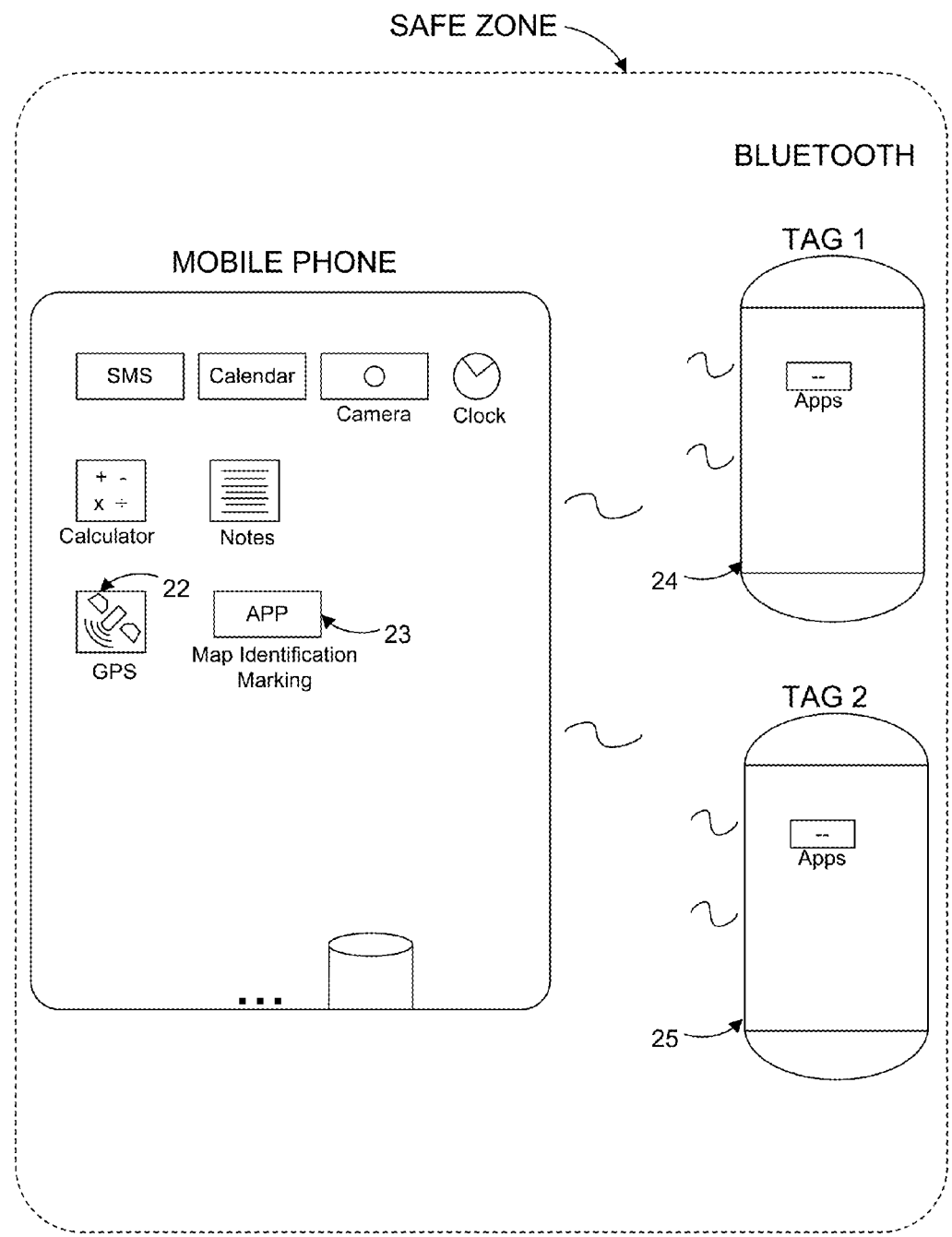
FIG. 6 illustrates a system within a safe zone, according to some embodiments.

Referring to FIG. 6, a mobile phone and a two distinct Bluetooth tags, tags 24 and 25, are shown. While the figure illustrates 2 Bluetooth tags, it will be appreciated that in various embodiments, more or fewer Bluetooth tags may be involved. The mobile phone may include a global positioning system (GPS) application 22, and a map identification masking application 23. The GPS application 22 may allow the mobile phone to track and/or report its own location. The GPS application 22 may allow, in various embodiments, the mobile phone to track and/or report the location of other devices, such as tags 24, and 25. In various embodiments, the Map identification masking application may allow a user of the mobile phone to identify geographic locations that fall within a designate safe zone or allowable zone. For example a safe zone may consist of all of the areas on a particular real-estate property belonging to a user. In various embodiments, so long as a Bluetooth tag (e.g., tag 24, or 25) remains within the safe zone, then no action need be taken. However if a Bluetooth tag is determined to fall outside the safe zone, then an alarm may be sounded, or some other action may be initiated. In some embodiments, if a Bluetooth tag is not detected within the safe zone, then some action may be initiated.

In some embodiments, a safe zone may be an area where one or more aspects of a system is turned off. For example, within a safe zone, a mobile phone may not even attempt to determine whether or not a Bluetooth tag is in range. Rather, the mobile phone may turn off this sensing part of its functionality. Further, in some embodiments, the Bluetooth tag may disable onboard circuitry for sensing the presence of a mobile phone nearby. A safe zone may constitute an area where the likelihood of a loss of an electronic device is considered small. Therefore, it may be desirable to conserve power or other resources by not actively monitoring the potential for loss within a safe zone.

Figure 7:
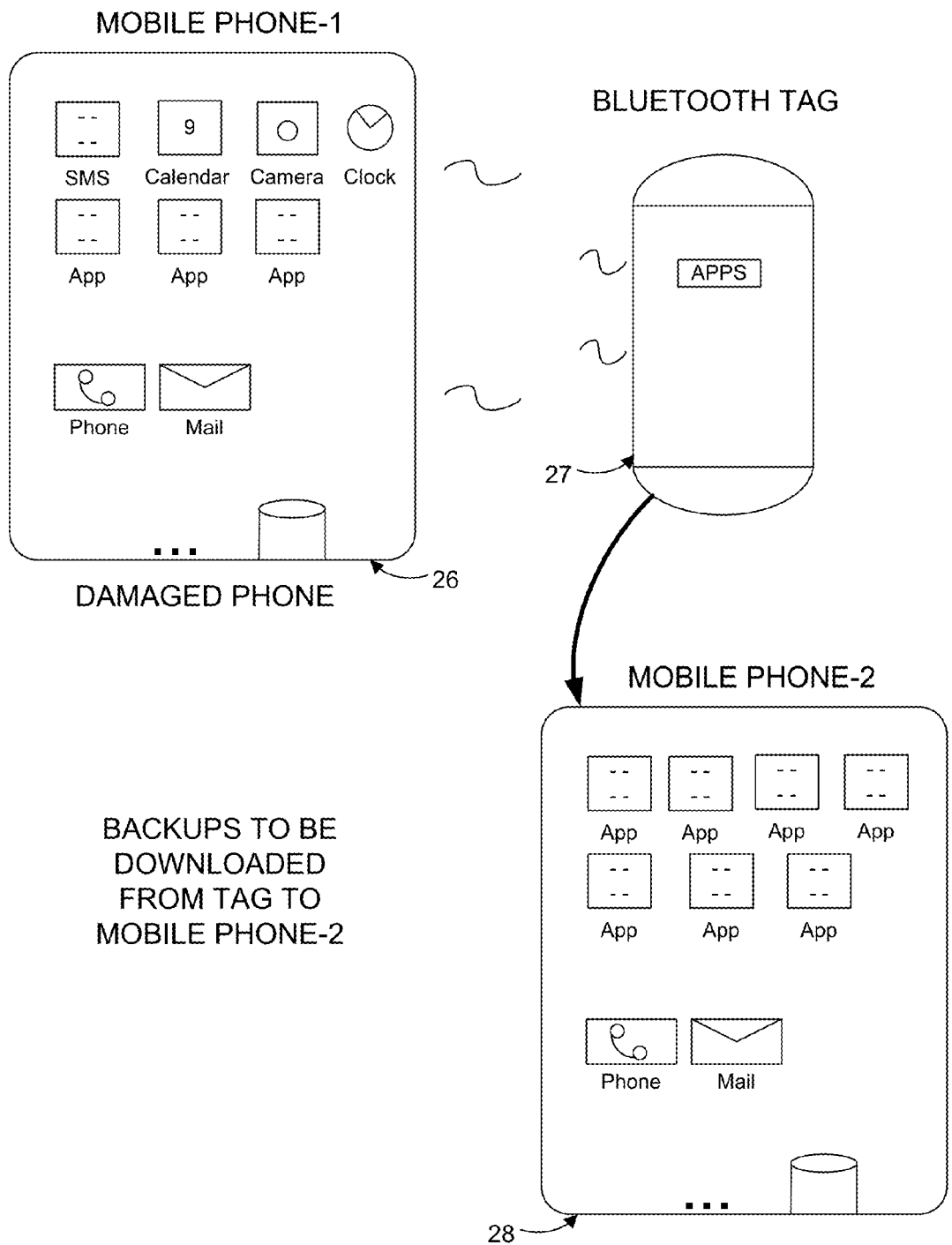
FIG. 7 illustrates a system for backing up data, according to some embodiments.

Referring to FIG. 7, a damaged mobile phone 26, a Bluetooth tag 27, and a new mobile phone 28 are shown. In various embodiments, various data and applications from damaged phone 26 may be downloaded to Bluetooth tag 27 in order to back up the data. The data and applications can then be uploaded to the new mobile phone 28. In this way, a user may be able to transfer data and applications from an old or damaged mobile phone to a new mobile phone. The user may be able to effect such transfer even if he is not in possession of the new mobile phone and the old mobile phone at the same time. For example, the user may transfer data from the old mobile phone to the tag, discard the old mobile phone, obtain the new mobile phone, and then transfer the data from the tag to the new mobile phone.

In various embodiments, using a Bluetooth tag as a backup or data storage means may allow a user to retain data or applications even if a mobile phone is lost or stolen. In various embodiments, a mobile phone may periodically (e.g., every day) backup data to a Bluetooth tag. The data may then be available on the Bluetooth tag for upload to a new phone in the event that the original phone is lost.

In various embodiments, a user may back up such things as email messages, text messages, images, videos, audio files, mp3 files, tweets, contact names, phone numbers, email addresses, fax numbers, programs, applications, financial account information, credit card information, medical information, and so on.

Figure 8:
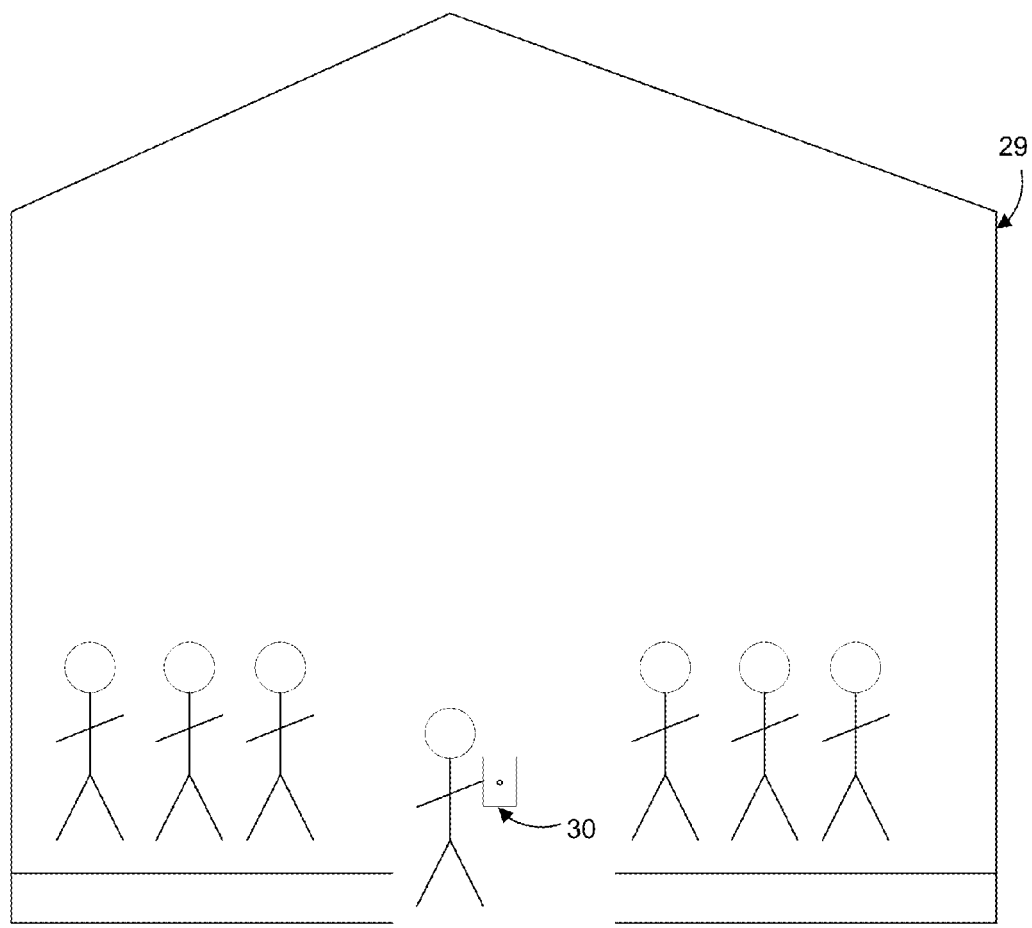
FIG. 8 illustrates a situation for defining a danger zone, according to some embodiments.

Referring to FIG. 8, a venue 29 is shown, where such venue may include crowds of people. The venue may be a mall, for example. A user within the venue may possess a GPS-enabled mobile phone 30. In various embodiments, the user may employ an application on the mobile phone to designate one or more locations that constitute a danger zone. If the mobile phone later determines that it is within the danger zone (e.g., using an incident GPS signal), then the mobile phone may take an action to avoid its loss or to mitigate the consequences of its loss. For example, if the mobile phone detects that it is in the danger zone, it may assume it has been stolen. It may, accordingly, sound an alarm, restrict access to its data, broadcast its location to a Bluetooth tag, etc. In some embodiments, the danger zone may determine a zone in which a Bluetooth tag should not enter. If the Bluetooth tag enters the danger zone, then the Bluetooth tag may take one or more actions to prevent its own loss or mitigate the consequences of its loss. For example, the Bluetooth tag may sound an alarm, or transmit its location to a mobile device or to some other Bluetooth tag.

Figure 9:
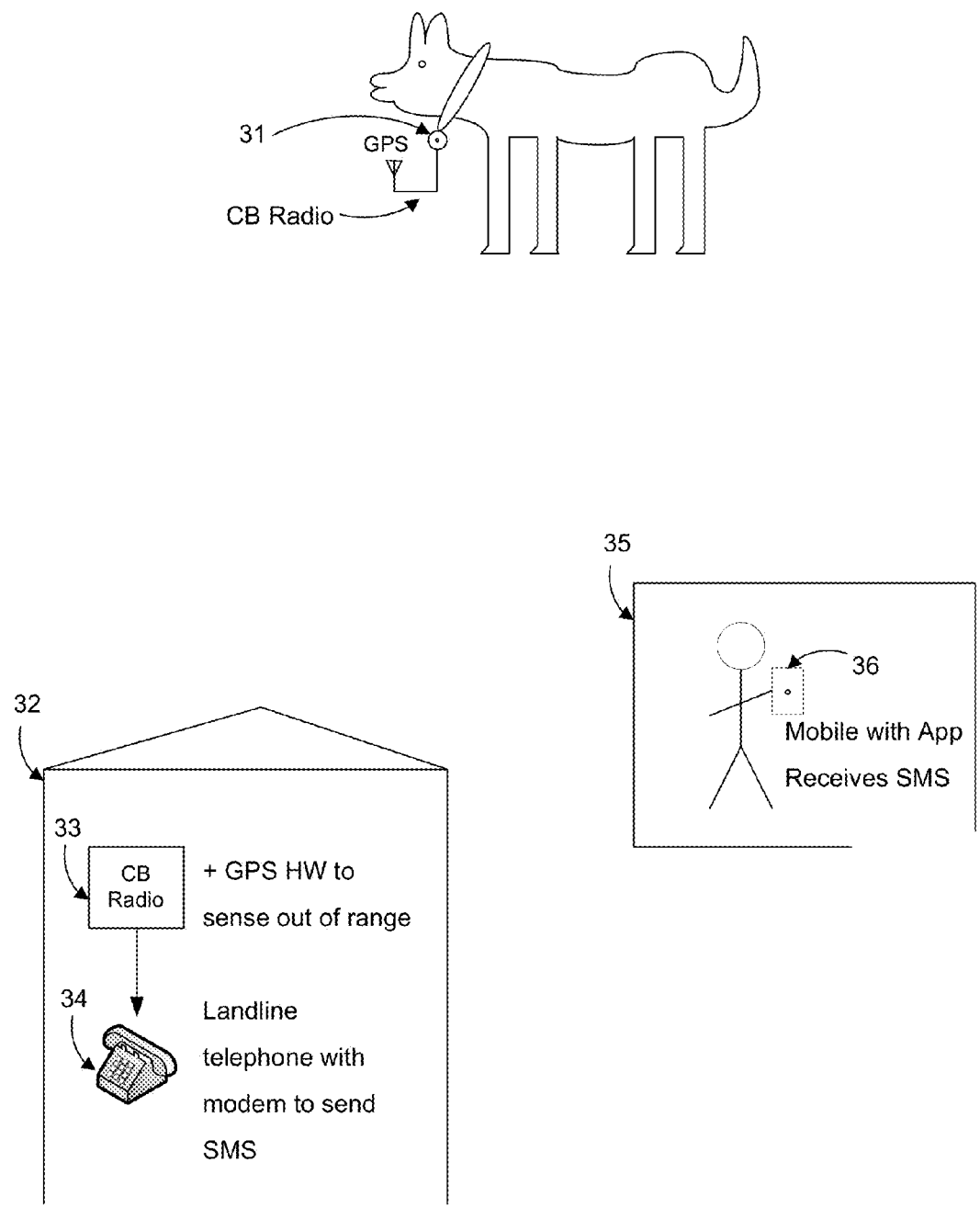
FIG. 9 illustrates a system for providing alerts, according to some embodiments.

Referring to FIG. 9, a system is shown that can provide an alert if a tag goes out of range. The figure illustrates an example with a pet 31 that is restricted to staying within an allowed range of a home 32. The pet wears a GPS tag and citizen band radio. The home 32 includes a citizen band radio and GPS hardware 33 to sense when the pet has gone out of the allowed range. The citizen band radio and GPS hardware 33 is, in turn, in communication with a landline telephone 34 that includes a modem for sending short message service (SMS) messages. In various embodiments, if the pet 31 wanders out of the allowed range, this is detected by the citizen band radio and GPS hardware, which will in turn communicate this to the telephone 31, which will be directed to send an SMS alert message to a user who may be at a remote location, such as at his office 35. The user can then receive the alert via his mobile phone 36, and thereafter take mitigating action. For example, the user may call his neighbor to see if the neighbor can locate the pet. It will be appreciated that the figure illustrates but some embodiments, and that other combinations of hardware and devices are possible.

Figure 10:
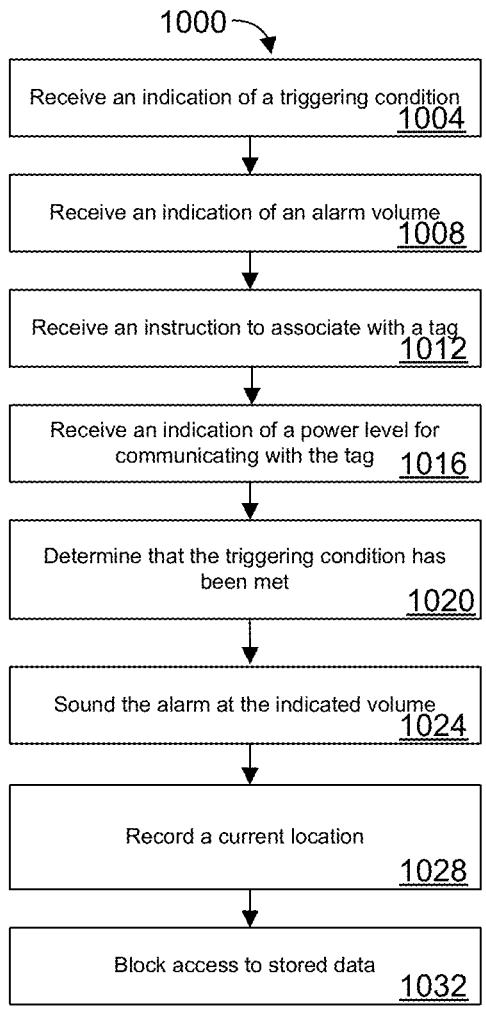
FIG. 10 illustrates a process flow for a mobile phone according to some embodiments.

FIG. 10 illustrates a sequence of steps that may be performed by a mobile phone or other electronic device, according to some embodiments.

Figure 11:
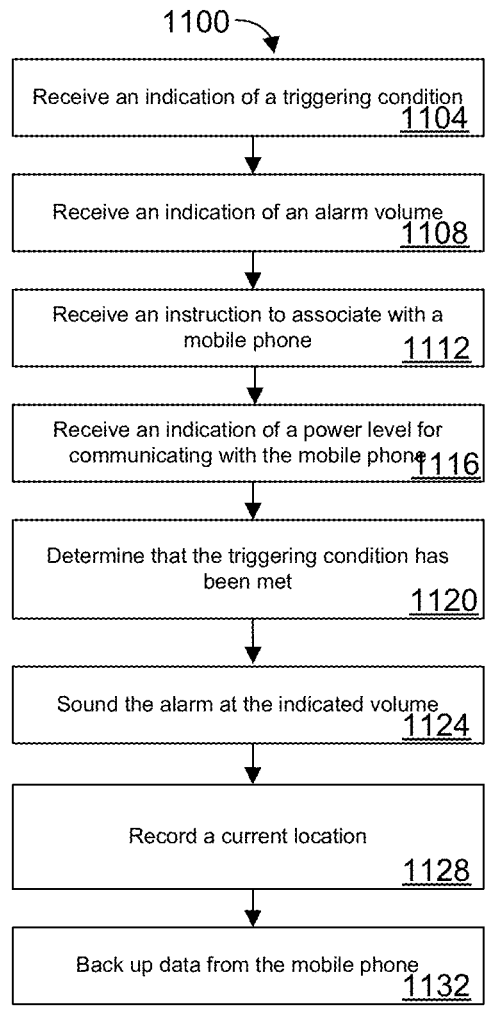
FIG. 11 illustrates a process flow for a Bluetooth tag, according to some embodiments.

FIG. 11 illustrates a sequence of steps that may be performed by a Bluetooth tag or other electronic device, according to some embodiments.

It will be appreciated that the process flows illustrated herein represent but some embodiments, and that various embodiments contemplate more and/or fewer steps, and various embodiments contemplate different orders of steps.

In various embodiments, an electronic device, such as a mobile phone, may maintain communication with another electronic device, such as a Bluetooth tag. The communication may include a continuous or periodic transmission of signals in one direction, in the other direction, or in both directions. For example, the mobile phone and Bluetooth tags may each transmit a signal to the other every second. In some embodiments, one of the devices may transmit a signal to the other only upon the occurrence of an event, such as motion. For example, if the mobile phone detects that it has been moved (e.g., by means of a GPS sensor or by means of an accelerometer), then the mobile phone may send a signal to the Bluetooth tag.

In various embodiments, during the course of communication, one or both of the electronic devices may determine the proximity of the other electronic device. In various embodiments, one of the electronic devices may attempt to determine the proximity of the other electronic device my means of measuring the strength of the signal received from the other electronic device. Under the assumption that the other electronic device is transmitting a signal at a known power level, it may be assumed that the other electronic device has moved further away if the power level of the received signal has decreased. Thus, in some embodiments, if the power level of the received signal from a first electronic device, at a second electronic device, is below a certain threshold, then the second electronic device may take some responsive action.

In various embodiments, a first electronic device may determine the proximity of a second electronic device by means of a Doppler shift detected in the signal received from the second electronic device. For example, if the detected frequency of the signal arriving from the second electronic device is lower than a baseline, then it may be assumed that the second electronic device is moving away. After a predetermined amount of time during which the Doppler shift has been detected, the first electronic device may determine that the second electronic device has moved more than a predetermined distance away. Accordingly, the second electronic device may take some responsive action.

In various embodiments, a first electronic device may transmit an indication of its position to a second electronic device. If the second electronic device determines that this position is more than a threshold distance from the second electronic device, then the second electronic device may take some responsive action.

As will be appreciated, various embodiments contemplate other ways in which one or both of two electronic devices may determine that the distance between them has crossed a particular threshold.

A responsive action may include any action in response to a detected separation between the first electronic device and second electronic device. A responsive action may include an action designed to reduce risk of separation, loss, loss of data, and/or harm from any of the aforementioned. A responsive action may include sounding an alarm or tone, increasing the signal power of a signal transmitted to the other device, sending out an electronic alert (e.g., a text message or email), placing a phone call, flashing a light, buzzing, vibrating, and so on. A responsive action may also include transmitting data from one electronic device to the other. For example, data transmitted may include sensitive data that a user may desire to back up and preserve. A responsive action may include blocking access to data (e.g., data may be encrypted and/or password protected). A responsive action may include erasing data (e.g., sensitive data like financial account information may be erased lest it get into the wrong hands). A responsive action may include transmitting to the other electronic device (or to any other device) information that may aid in locating a given electronic device. For example, a first electronic device, upon detecting an increased separation from a second electronic device, may transmit its coordinates and/or direction of motion to a second electronic device.

In various embodiments, one or more triggers for a responsive action may be configurable. In various embodiments, one or more responsive actions may be configurable. In various embodiments, a user may configure triggers and/or responsive actions. In various embodiments, a customized application on a mobile phone may allow a user to configure triggers and/or responsive actions. The customized application may include a program that generates a user interface. The user interface may present the user with one or more configuration options. The user may then select a desired option through interaction with the application, such as through selecting from a series of options, checking a box, inputting a number, selecting from a drop down menu, scrolling to a particular option, or via any other means, as will be appreciated.

Configurable Triggers

In various embodiments, a user may configure a distance between two devices (e.g., an alarm sounds after 10 feet of separation); a direction of motion of one device relative to another (e.g., an alarm sounds if one device is moving away from the other); a relative position of two devices (e.g., an alarm sounds if one device is more than 20 feet north of the other device; e.g., an alarm sounds if one device is more than 5 meters above the other device); a triggering location (e.g., an alarm will sound if a device is at a particular location; e.g., an alarm will sound if a device is within a particular geographic region; e.g., an alarm will sound if a device is outside a particular geographic region); a velocity (e.g., an alarm will sound if one device is moving faster than 5 kilometers per hour); an acceleration (e.g., an alarm will sound if a device is accelerating at more than 0.05 times gravity); an ambient temperature (e.g., an alarm will sound if an ambient temperature is more than 35 C); a detected signal power (e.g., an alarm may sound if a mobile phone detects a signal strength from a Bluetooth tag that is less than a predetermined level); an ambient humidity; an ambient condition; a signal from the other electronic device (e.g., the mobile phone may simply instruct the Bluetooth tag to sound an alarm) and any other triggering condition, and any other value for a triggering condition.

Configurable Parameters for Communicating and Tracking

In various embodiments, a user may configure one or more parameters by which a first electronic device may communicate with a second electronic device, and/or by which a first electronic device may track a second electronic device. A user may configure a signal strength; a signal strength to be used by a first electronic device (e.g, a signal strength of a wireless communication protocol, such as Bluetooth), a signal strength to be used by a second electronic device, a frequency to be used, a channel to be used, a wireless protocol to be used (e.g., Bluetooth; e.g., Wi-Fi; e.g., CB radio) an amount per unit time with which one or more electronic devices should transmit signals (e.g., once per second; e.g., 10 times per second), an amount per unit time with which one or more electronic devices should attempt to detect signals; an amount of time between when a triggering condition is received and when a responsive action should be taken (e.g., a mobile phone may wait 3 seconds before sounding an alarm, in case the triggering condition disappears within that 3 seconds); and any other parameter, and any other value of a parameter.

Configurable Responsive Actions

In various embodiments, a user may configure one or more responsive actions that may be taken by an electronic device. Such responsive actions may occur upon the detection of a triggering condition. In various embodiments, a user may configure the volume of an alarm; the pitch of an alarm; a particular tune or melody that would constitute an alarm; whether or not a message should be sent (e.g., whether or not an SMS message should be sent); the address to which a message should be sent (e.g., a user may specify a phone number to which an SMS message should be sent; e.g., a user may specify an email address to which a message should be sent); the contents of a message that will be sent (e.g., a message may read, "Your dog has wandered off."); other components of an alarm (e.g., a user may specify that a device should vibrate in response to a triggering condition); the duration that an alarm will go off (e.g., an alarm may be set to last 20 seconds); what data should be backed up (e.g., a user may specify that all contact information should be backed up from a mobile phone to a Bluetooth tag); what data should be erased (e.g., the user may specify that all financial records should be erased); what data should be encrypted; what password or key would be required to view backed-up data (e.g., the user may specify a password that must be provided to a Bluetooth tag in order to obtain stored data onto a new mobile phone that replaces a lost mobile phone); what password or key would be required to recover locked or encrypted data; what applications should continue to function (e.g., the user may set one or more applications to become non-functional); whether or not a device should be usable (e.g., a user may set a mobile phone to become unusable even for calling); what password or key will be required in order to recover the functionality of an application or of a device itself; and any other responsive actions; and any other value for a responsive action.

In various embodiments, when a user enters configuration information (e.g., on a mobile phone), the application may transmit such information to the other device. For example, a mobile phone may transmit to a Bluetooth tag the configured distance range, beyond which the Bluetooth tag should sound an alarm.

Data Backup

A system according to various embodiments may serve to back up and preserve data in the event that a device with data is lost. For example, if a mobile phone is lost, a user may be able to recover data from the phone that has been backed up on a Bluetooth tag. Data that may be backed up may include voice data (e.g., stored voicemails), images, videos, address book data, music, ringtones, text messages, emails, and any other data.

In various embodiments, one device may periodically send data backups to another device. For example, a mobile phone may periodically send to a tag any data that has changed on the mobile phone. The tag may store such new data. In some embodiments, if a user deletes data on one device, the other device may be appraised of this action and delete its copy of the data. Thus, in various embodiments, two or more devices may remain synchronized. In various embodiments, a mobile phone and a tag may maintain synchronized sets of data. In various embodiments, a mobile phone and more than one tag may maintain synchronized sets of data. In some embodiments, data from one device may be backed up on multiple other devices. For example, the data from a phone may be backed up on several Bluetooth tags. In some embodiments, data from a phone may be stored in parts on different tags. For example, some of the mobile phone's data may be stored on a first tag, and some of the data may be stored on a second tag.

In some embodiments, a syncing process may occur in multiple stages. For example, a mobile phone may sync its data with that on a first Bluetooth tag. The first Bluetooth tag may then sync its data with that stored on a second Bluetooth tag. In this way, there may be multiple backup repositories for the data.

In various embodiments, a user may access backed-up data on a second mobile phone after a first mobile phone has been lost. In some embodiments, a user may access backed up data on a second mobile phone even if the first is still in his possession. In either event, the user may cause the initiation of communication between the second mobile phone and a Bluetooth tag with backed-up data. The data may then be uploaded to the second mobile phone. As will be appreciated, data may be backed-up, stored, synchronized, and accessed by any number of devices and various different types of devices, not just mobile phones and Bluetooth tags.

In various embodiments, a user may add a new Bluetooth tag to a network of existing Bluetooth tags. The new Bluetooth tag may be configured to automatically obtain a copy of backed-up data, so that the new Bluetooth tag may serve as a data repository for future access.

Ad-Hoc Network

In various embodiments two or more electronic devices may form a network of devices in which each may be tracked by one or more of the other devices. The electronic devices may include a mobile phone and Bluetooth tags, for example. Utilizing a network with additional tags (e.g., with more than one) may extend the range over which devices can be tracked, for example. For instance, if two devices can track each other up to a distance of 3 meters, than adding a third device means that two of the devices can be up to 6 meters apart, and still allow tracking.

Various embodiments may include a process for adding a new electronic device (e.g., a new tag) to an existing network of tags. In some embodiments, a user may access an application on his mobile phone and indicate that he wishes to add a new tag. The application may thereupon attempt to detect a signal (e.g., a Bluetooth signal) from the new tag. Upon detecting the signal, the application may accept the new tag as part of the network, and begin communicating with the new tag.

In some embodiments, when a new tag is added to a network, the user may be asked to configure one or more items related to monitoring, communicating, triggering, and/or responsive actions. For example, the user may set a power at which the new tag should transmit, or a separation distance that would trigger an alarm, for example.

In some embodiments, a user may be asked to provide a password or other security verification when adding a new device to the network. In this way, the chances of the introduction of a malicious device that could steal user data may be reduced. In some embodiments, a user may be asked to confirm some characteristic of the device, such as its name, model, color, size, brand, etc. This may allow the user and/or the application to verify that the device being added is indeed the intended device.

In various embodiments, various additional triggering conditions may become available with when there are more than two devices in a network. For example, a triggering condition may require that communication is lost with at least two devices. Thus, for example, if there is a loss of communication with just one tag, no alarm may sound.

Location Based Service

In some embodiments, location based services can be added without a wireless network provider. Such services may be offered over 2-way radio (walkie-talkie frequency) for example. For example, a user without access to GPS may nevertheless join an ad-hoc network of devices that communicate wirelessly with one another. The user's device may receive communications from one or more other devices via walkie-talkie frequency, via CB radio, via Bluetooth, or via any other frequency or protocol. One of the other devices may possess its own coordinates (e.g., from the presence of a GPS sensor), and may transmit such coordinates to the user's device. The network may consist of one or more devices that do not belong to the user. Such other devices may include a Garmin Rino series, which may combine a GPS receiver with an FRS/GMRS walkie-talkie. Thus, the user may receive location data even without personally owning a GPS-based device.

In some embodiments, a network may allow the transmission of text messages and/or pictures among the devices, including among the user's device and other devices that don't belong to the user. Text messages and/or pictures may be transmitted using personal radio, in some embodiments.

Data Protection and Backup

As described herein, various embodiments allow for data on a first electronic device to be backed up and stored on a second electronic device for later recovery in case the first electronic device is lost. In various embodiments, when it is determined that the first electronic device may be lost, (e.g., the first electronic device no longer detects a signal from a second electronic device), then the first electronic device may take steps to protect the data stored on the first electronic device.

In various embodiments, a user may be initially (or at some stage) asked to select what data is to be protected, and what level of protection is to be afforded to such data. For example, in interacting with the application, a user may be stepped through various files, emails, sms messages, contacts, and so on, and may be asked for each what level of protection he wishes to have in case of a triggering event. Levels of protection may include deleting the data, hiding links to the data, encrypting the data, encoding the data, password protecting the data, and so on. In various embodiments, the user may be asked at an initial stage what password or what access key he would like to use in order to regain access to the data in the event that the wayward electronic device (e.g., mobile phone) is later recovered. The user may enter a password, for example, and such password may be stored in the electronic device.

In various embodiments, an electronic device may upload data to a central server, cloud, or to some other repository. The electronic device may then be able to delete its local copy of the data to prevent unauthorized access. For example, upon the detection of a triggering event, the electronic device may delete its local copy of one or more items of data. As another example, upon the detection of a triggering event, an electronic device may first upload its data to a central server (or to some other repository), and may then delete its copy of the data. In some embodiments, an electronic device may first upload its data to a central server (or other repository), and then restrict access to its local copy of the data (e.g., via encryption).

Tracking the Last Point of Loss

In various embodiments, even when an item is lost, it may be desirable to determine the last location where the item was known to be. This may allow the user, for example, to return to the location and to attempt to recover the object.

Accordingly, in various embodiments, a mobile phone may periodically record its own location. The location may be determined using an onboard GPS sensor, for example. Concurrently, the mobile phone may maintain communication with a Bluetooth tag. If the phone loses communication with the Bluetooth tag, then the phone may note the location and/or the time at which communication was lost. The mobile phone may then make this location and/or time visible to the user. For example, the user may navigate the application on the mobile phone to call up a location log of the Bluetooth tag. In some embodiments, the mobile phone may show the user on a map where the phone was when it last had communication with the Bluetooth tag. In some embodiments, the mobile phone may show the user a map with the path of the phone leading up to the time when communication was lost with the Bluetooth tag.

In various embodiments, the mobile phone may log one or more other parameters describing its communication with the Bluetooth tag. For example, the mobile phone may log the received signal strength. Then, if the log shows a gradual drop in received signal strength, it may be inferred, for example, that the Bluetooth tag might have lost power rather than having been lost entirely. However, if there was a sudden drop in received signal strength, then it may be inferred that the Bluetooth tag was separated suddenly.

In various embodiments, the mobile phone may log the trajectory and/or relative trajectory of the Bluetooth tag. Accordingly, it may be possible to present to the user an indication of the direction in which the Bluetooth tag was traveling at its last known location.

Configuring Safe and Risky Zones

In a typical usage scenario, a user may not want to keep the tags and phone application active at all times. This may serve to a) prevent draining the battery; and/or b) to avoid nuisance alarms when they are not required (e.g., to avoid false alarms). In various embodiments, the user may deactivate a tag when it is not required (e.g., while the user is at home). However, it may be desirable that the tags become active again when the user moves out of such areas (e.g., when the user carries his/her mobile phone and tag outside of his/her home).

Accordingly, in various embodiments, a user can define one or more zones in which a tag may be active, and certain zones in which a tag may be inactive. In various embodiments, a user may define a zone in which a tag is inactive. By default, the tag may become active outside this defined zone.

A user may define a zone in various ways. In some embodiments, a user may define a zone by entering an address; by entering an address plus a "distance from" (e.g., a tag will remain inactive within a circle of 200 meter radius from a particular address); by entering a particular coordinate (e.g., latitude and longitude); by entering a zip code; by entering the name of a building or point of interest; by tracing out an area on a digital map; or by any other means. In some embodiments, a user may physically travel in or to a zone and designate his/her current location as either in the zone, out of the zone, or a boundary of the zone. For example, a user may define a zone by walking the perimeter of her property with a mobile phone, and periodically indicating that her current location is part of the boundary of a zone. The mobile phone may obtain its current location using an inbuilt GPS sensor, for example.

In various embodiments, when a user enters a particular zone (e.g., a "safe zone"), one or more functionalities of the system may be disabled or scaled down. For example, once a user enters her home, the mobile phone and Bluetooth tag may stop communicating with one another, and neither may sound an alarm even though no signal is detected from the other. In various embodiments, when a user leaves a zone (e.g., leaves a "safe zone"), then one or more functionalities of the system may be restored or brought back to full capacity. For example, the mobile phone and Bluetooth tag may resume periodic communication, and the Bluetooth tag may alarm if it becomes separated from the mobile phone my more than a predetermined distance.

The following are embodiments, not claims:

B. A system comprising:
a first device including:
   a first wireless transceiver;
   a first position sensor;
   a first memory, in which the first memory stores first instructions and first data; and
   a first processor electronically coupled to the first memory; and
a second device including:
   a second wireless transceiver;
   a second memory, in which the second memory stores first instructions and second data; and
   a second processor electronically coupled to the second memory,
in which the first processor is operable to receive first instructions from the first memory and execute the first instructions to:
   present to a user a set of options for configuration;
   receive from the user a selection of a first option for configuring a triggering condition;
   receive from the user a selection of a second option for configuring a responsive action;

receive from the user a selection of a third option for configuring a means of communication between the first device and the second device;

receive from the user a selection of a fourth option for designating a geographic region, such that the responsive action may only be taken outside of the geographic region;

communicate with the second device in accordance with the third option;

determine that the first device has moved outside of the geographic region;

determine that the triggering condition has occurred; and taking, in response to the triggering condition, and in response to the movement outside of the geographic region, the responsive action, in which the second processor is operable to receive second instructions from the second memory and execute the second instructions to:

receive from the first device an indication of the third option for configuring a means of communication between the first device and the second device; and communicate with the first device in accordance with the third option, in which the triggering condition includes the realization of at least a certain distance between the first device and the second device, and in which taking the responsive action includes causing the first device to sound an alarm.

B.1 The system of embodiment B further comprising a third device, in which the triggering condition includes the realization of a certain distance between the first device and the second device, and between the first device and the third device.

A. A device comprising:
a memory, in which the memory stores first instructions and first data; and
a processor electronically coupled to the memory,
in which the processor is operable to receive first instructions from the memory and execute the first instructions to:
present to a user a set of options for configuration;
receive from the user a selection of a first option for configuring a triggering condition;
receive from the user a selection of a second option for configuring a responsive action;
receive from the user a selection of a third option for configuring a means of communication between the device and a second device;
communicate with the second device in accordance with the third option;
determine that the triggering condition has occurred; and
taking, in response to the triggering condition, the responsive action.

A.a The device of embodiment A, in which the device is a cellular phone.

A.b The device of embodiment A, in which the second device is a Bluetooth device.

A.c The device of embodiment A, in which the first data is an address book.

A.d The device of embodiment A, in which the first data includes user financial account information.

A.e The device of embodiment A, in which the device is further operable to transmit an indication of the first option for configuring the triggering condition to the second device.

A.f The device of embodiment A, in which the device is further operable to transmit an indication of the second option for configuring the responsive action to the second device.

A.g The device of embodiment A, in which the device is further operable to transmit to the second device an indication of the third option for configuring the means of communication.

A.25 The device of embodiment A, further comprising a sensor for detecting the current position of the device.

A.25.1 The device of embodiment A, in which the sensor is a global positioning system (GPS) sensor.

A.24 The device of embodiment A, in which the processor is further operable to:
determine that the device is inside a first geographic region;
cause the device to communicate at a first interval with the second device while the device is within the first geographic region;
determine that the device is inside a second geographic region; and
cause the device to communicate at a second interval with the second device while the device is within the second geographic region,
in which the second interval is shorter than the first interval.

A.24.1 The device of embodiment A in which the second geographic region includes all geographic regions outside of the first geographic region.

A.25 The device of embodiment A, in which the processor is further operable to:
determine that the device is inside a first geographic region;
cause the device to communicate at a first power level with the second device while the device is within the first geographic region;
determine that the device is inside a second geographic region; and
cause the device to communicate at a second power level with the second device while the device is within the second geographic region,
in which the second power level is higher than the first power level.

A.23 The device of embodiment A in which communicating with the second device in accordance with the third option includes communicating with the second device at a particular radio frequency.

A.24 The device of embodiment A in which communicating with the second device in accordance with the third option includes communicating with the second device at a particular interval.

A.25 The device of embodiment A in which communicating with the second device in accordance with the third option includes communicating with the second device at a particular power level.

A.26 The device of embodiment A in which communicating with the second device in accordance with the third option includes communicating with the second device using a third device as a relay.

A.22 The device of embodiment A in which the memory stores second data, third data, and fourth data, and in which, in taking the responsive action, the processor is operable to:
encrypt the first data;
initiate password protection for the second data;
delete the third data; and
copy the fourth data to the second device.

A.9 The device of embodiment A in which, in taking the responsive action, the processor is operable to encrypt the first data.

A.10 The device of embodiment A in which, in taking the responsive action, the processor is operable to restrict access to the first data, wherein access is granted only to one who can provide a password.

A.11 The device of embodiment A in which, in taking the responsive action, the processor is operable to delete the first data.

A.12 The device of embodiment A in which, in taking the responsive action, the processor is operable to create a backup of the first data.

A.13 The device of embodiment A in which, in taking the responsive action, the processor is operable to transmit the first data to the second device.

A.13 The device of embodiment A in which, in taking the responsive action, the processor is operable to sync with the second device such that both the device and the second device have current copies of the data.

A.14 The device of embodiment A in which, in taking the responsive action, the processor is operable to transmit the first data to a cloud storage facility.

A.23 The device of embodiment A in which, in taking the responsive action, the processor is operable to cause the device to perform at least one of:
  (a) sending out a text message;
  (b) sending out an email message;
  (c) emitting a tone;
  (d) emitting a buzz;
  (e) vibrating;
  (f) transmitting to the second device a current location of the device;
  (g) transmitting to the second device a direction of motion of the device;
  (h) placing a phone call; and
  (i) transmitting a signal to the second device.

A.19 The device of embodiment A in which the triggering condition is a condition where the second device is moving away from the device.

A.18 The device of embodiment A in which the triggering condition is a condition where the second device is moving away from the device at greater than a threshold speed.

A.20 The device of embodiment A in which the processor is further operable to measure a Doppler shift in a signal received from the second device.

A.20.1 The device of embodiment A.20 in which the triggering condition is a threshold Doppler shift above which a signal is received from the second device.

A.15 The device of embodiment A in which the triggering condition is a condition where no signal from the second device is detected at the device.

A.16 The device of embodiment A in which the triggering condition is a condition where no signal from the device is detected at the second device.

A.8 The device of embodiment A in which the triggering condition is a threshold power level below which a signal from the second device is received at the device.

A.9 The device of embodiment A in which the triggering condition is a threshold power level below which a signal from the device is received at the second device.

A.5 The device of embodiment A in which, in receiving the selection of the first option for configuring a triggering condition, the processor is operable to receive from the user the selection of the first option for designating a location.

A.5' The device of embodiment A in which, in receiving the selection of the first option for configuring a triggering condition, the processor is operable to receive from the user the selection of the first option for designating a geographic region.

A.6 The device of embodiment A in which, in receiving the selection of the first option for configuring a triggering condition, the processor is operable to receive from the user the selection of the first option for designating a series of locations, wherein the series of locations delimits a boundary of a geographic region.

A.6.1 The device of embodiment A.6, in which, in determining that the triggering condition has occurred, the processor is operable to determine that the device is outside of the geographic region.

A.6.2 The device of embodiment A.6, in which, in determining that the triggering condition has occurred, the processor is operable to determine that the device is inside of the geographic region.

A.6.3 The device of embodiment A.6, in which, in determining that the triggering condition has occurred, the processor is operable to determine that the second device is outside of the geographic region.

A.6.4 The device of embodiment A.6, in which, in determining that the triggering condition has occurred, the processor is operable to determine that the second device is inside of the geographic region.

A.6x The device of embodiment A in which, in receiving the selection of the first option for configuring a triggering condition, the processor is operable to receive from the user the selection of the first option for designating an address plus a distance from the address.

A.4 The device of embodiment A in which the second device is a Bluetooth device.

A.0 The device of embodiment A, further comprising a touch screen display, in which, in presenting the set of options, the processor is further operable to present to the user the set of options via the display.

A.0.1 The device of embodiment A.0 in which, in receiving the selection of the first option, the processor is operable to receive the selection of the first option from the user via the touch screen display.

The foregoing had described various embodiments, but it will be appreciated that the foregoing is not intended to be limiting and that other embodiments are contemplated, including other embodiments falling within the spirit and scope of the present disclosure.

The invention claimed is:

1. A device comprising:
  a memory, in which the memory stores first instructions and first data; and
  a processor electronically coupled to the memory,
  in which the processor is operable to receive first instructions from the memory and execute the first instructions to:
    present to a user a set of options for configuration;
    receive from the user a selection of a first option for configuring a triggering condition;
    receive from the user a selection of a second option for configuring a responsive action;
    receive from the user a selection of a third option for configuring a means of communication between the device and a second device;
    communicate with the second device in accordance with the third option;
    determine that the triggering condition has occurred
    take, in response to the triggering condition, the responsive action;
    determine that the device is inside a first geographic region;

cause the device to communicate at a first interval with the second device while the device is within the first geographic region;
determine that the device is inside a second geographic region; and
cause the device to communicate at a second interval with the second device while the device is within the second geographic region,
in which the second interval is shorter than the first interval.

2. A device comprising:
a memory, in which the memory stores first instructions and first data, second data, third data, and fourth data; and
a processor electronically coupled to the memory,
in which the processor is operable to receive first instructions from the memory and execute the first instructions to:
present to a user a set of options for configuration;
receive from the user a selection of a first option for configuring a triggering condition;
receive from the user a selection of a second option for configuring a responsive action;
receive from the user a selection of a third option for configuring a means of communication between the device and a second device;
communicate with the second device in accordance with the third option;
determine that the triggering condition has occurred; and
take, in response to the triggering condition, the responsive action, wherein the responsive action includes:
encrypting the first data;
initiating password protection for the second data;
deleting the third data; and
coping the fourth data to the second device.

3. A device comprising:
a memory, in which the memory stores first instructions and first data; and
a processor electronically coupled to the memory,
in which the processor is operable to receive first instructions from the memory and execute the first instructions to:
present to a user a set of options for configuration;
receive from the user a selection of a first option for configuring a triggering condition;
receive from the user a selection of a second option for configuring a responsive action;
receive from the user a selection of a third option for configuring a means of communication between the device and a second device;
communicate with the second device in accordance with the third option;
determine that the triggering condition has occurred;
receive first instructions from the memory and execute the first instructions to receive an advanced indication of a particular second device;
take, in response to the triggering condition, the responsive action, wherein the responsive action includes:
syncing with the second device such that both the device and the second device have current copies of the data.

4. A device comprising:
a memory, in which the memory stores first instructions and first data; and
a processor electronically coupled to the memory,
in which the processor is operable to receive first instructions from the memory and execute the first instructions to:
present to a user a set of options for configuration;
receive from the user a selection of a first option for configuring a means of communication between the device and a second device;
receive from the user a selection of a second option for configuring a triggering condition, in which the triggering condition is a condition where the second device is moving away from the device at greater than a threshold speed;
receive from the user a selection of a third option for configuring a responsive action;
communicate with the second device in accordance with the first option;
determine that the triggering condition has occurred; and
take, in response to the triggering condition, the responsive action.

* * * * *